United States Patent
Brawley

(10) Patent No.: US 8,528,963 B1
(45) Date of Patent: Sep. 10, 2013

(54) EXPANDABLE CARGO AND CAMPING TRAILER

(76) Inventor: Tom Brawley, Greenbrier, AR (US)

( * ) Notice: Subject to any disclaimer, the term of this patent is extended or adjusted under 35 U.S.C. 154(b) by 230 days.

(21) Appl. No.: 12/576,503

(22) Filed: Oct. 9, 2009

Related U.S. Application Data

(60) Provisional application No. 61/195,823, filed on Oct. 10, 2008.

(51) Int. Cl.
*B60P 3/345* (2006.01)

(52) U.S. Cl.
USPC .......................... 296/169; 296/174

(58) Field of Classification Search
USPC ................................. 296/169, 174
See application file for complete search history.

(56) References Cited

U.S. PATENT DOCUMENTS

| | | | |
|---|---|---|---|
| 1,318,994 A | | 10/1919 | Hancock |
| 1,320,794 A | * | 11/1919 | Palmer et al. ................. 296/169 |
| 1,431,783 A | * | 10/1922 | Diefenderfer ................. 296/174 |
| 1,644,892 A | * | 10/1927 | Noble ........................... 296/174 |
| 1,671,457 A | * | 5/1928 | Wiedman ...................... 296/174 |
| 2,155,582 A | | 4/1939 | Bond |
| 2,788,238 A | | 4/1957 | Baird |
| 3,558,180 A | * | 1/1971 | Algire ........................... 296/174 |
| 3,887,226 A | * | 6/1975 | Hart ............................ 296/26.11 |
| 5,011,216 A | | 4/1991 | Baughman |
| 6,135,539 A | * | 10/2000 | Bailey et al. .................. 296/169 |
| 6,926,343 B2 | * | 8/2005 | Bontrager et al. ............ 296/174 |
| 7,178,857 B2 | | 2/2007 | Williams |
| 8,070,216 B2 | * | 12/2011 | Defoy et al. ............. 296/193.01 |

OTHER PUBLICATIONS

2003 Four Winds Travel Trailers and Fifth Wheels, catalog, (claimed copyright date of 2002).

\* cited by examiner

*Primary Examiner* — Joseph Pape
(74) *Attorney, Agent, or Firm* — J. Charles Dougherty

(57) ABSTRACT

A expandable camping and cargo trailer features at least one fold-out bunk mounted at a side wall of the trailer. The frame of the trailer is designed to support the weight of the bunk when folded out and carrying a load. In certain versions, the frame members of the side wall frame are doubled or tripled in order to provide sufficient strength and rigidity to the side wall. The trailer is sufficiently light to be pulled by most cars and light trucks, while also providing sufficient storage space for motorcycles, ATVs, and the like.

20 Claims, 4 Drawing Sheets

EXPANDABLE CARGO AND CAMPING TRAILER

CROSS-REFERENCE TO RELATED APPLICATIONS

This application claims the benefit of U.S. provisional patent application No. 61/195,823, entitled "Expandable Camping and Cargo Trailer," filed on Oct. 10, 2008. The entire disclosure of such provisional patent application is hereby incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to trailers, and in particular to trailers that may be used both to haul cargo and for providing fold-out sleeping quarters for human occupants at the same time that cargo is stored in the trailer.

2. Brief Description of the Related Art

Fully-covered, general-purpose trailers designed to be pulled behind trucks for the purpose of transporting cargo are well known in the art. These trailers may be used, for example, by motorcycle and all-terrain vehicle (ATV) enthusiasts as a way to transport their vehicles to and from events, rallies, and other locations where these vehicles may be used. Lightweight trailers constructed for this purpose, sometimes called "toy haulers," have risen in popularity along with the rise in popularity of motorcycles and ATVs. Such trailers are commonly constructed either with steel frames and plywood walls, or with all-aluminum construction. The all-aluminum construction trailers are typically lighter, and therefore generally considered more desirable due to the fuel savings that results from their lower weight, but they also tend to be more expensive. Either type of trailer design is generally light enough to be pulled by light trucks or even some cars, increasing their appeal in the marketplace.

Camping trailers are also well known in the art, and may come in a variety of forms, including everything from small "pop-up" tent trailers to the often very large "fifth-wheel" travel trailers. Pop-up trailers are those that have a tent structure that folds out when the trailer arrives at a camping destination. They are generally quite light, but because of their construction have limited storage capacity while traveling. Fifth-wheel trailers, on the other hand, may be quite large, but generally require specialized heavy-duty trucks with significant towing capacity in order to pull them. A special mount is required in the bed of the truck to receive the hitch, or "fifth wheel," for these trailers. These types of trailers are also very expensive. Only the largest fifth-wheel trailers generally provide space for the storage of recreational vehicles, such as motorcycles and ATVs, while also providing living and sleeping spaces for occupants.

Recreational vehicles (RVs) and fifth-wheel travel trailers that feature slide-out or pop-out components to increase their available floor space when stationary have become very popular in recent years. These sections are folded in for travel, and then expanded for use when the vehicle or trailer is parked. Such systems are generally quite complex and expensive, and are thus generally employed only on the larger trailers and RVs. These systems add significantly to the overall cost and weight of the trailer or vehicle. A lighter, less-expensive alternative is self-supporting bunk doors, which simply fold out from the side of the trailer or vehicle with a tent-like canopy to provide shelter. Typically, the bunks are held by cables when in the extended, horizontal position. These fold-out bunk doors have been supplied to the RV and trailer industry by manufacturers such as Nappanee Window of Nappanee, Ill. These fold-out bunk doors, however, have previously only been employed on the larger, more expensive sorts of travel trailers. The cost of such trailers, the cost of the specialized, heavy-duty vehicles to pull them, and the high cost of fuel necessary to transport them, places such systems out of the reach of many consumers.

The inventor of the present invention has recognized that it would be highly desirable to provide a single, inexpensive, lightweight trailer that can be used both for the purpose of transporting recreational vehicles—such as motorcycles and ATVS—as well as other goods, while also providing a sleeping space like a traditional recreational vehicle or fifth-wheel camper. This type of trailer would, for example, allow the owner to attend far-away events, such as motorcycle rallies and the like, without the need for purchasing a large travel trailer or securing other accommodations upon arrival. Such a trailer would ideally be light enough to be easily and safely pulled by most cars or traditional light trucks, thereby obviating the need for the purchaser to also purchase an expensive, specialized tow vehicle. Such a trailer would be desirable by a large number of persons who simply cannot afford many of the trailers and recreational vehicles that are available today, or who would simply prefer a lighter, smaller trailer. Although attempts have been made to add sleeping beds/bunks to traditional cargo trailers, such designs have not been successful because the space required for the sleeping bed/bunk takes up a significant amount of the available space that could be used for a motorcycle, ATV, or other cargo. The inventor recognized, however, that this goal could be achieved if a fold-out bunk could be mounted on a standard "toy hauler" or light cargo trailer. But investigation by the inventor revealed that simply attaching a fold-out bunk to a standard cargo trailer was unworkable. The wall frame of a standard aluminum or steel-frame cargo trailer could not be utilized in order to create a combination cargo and camping trailer with self-supporting bunk doors, since the wall frame could not carry the necessary load. The result would be a wall that would bow outward or flex downward, or racking of the frame of the trailer to one side if unevenly loaded. The inventor found that an improved trailer design would be necessary in order to achieve the advantages of both a lightweight, inexpensive cargo trailer and also provide camping quarters by means of a fold-out bunk that did not diminish the cargo capacity of the trailer.

What is desired then is a single, inexpensive, lightweight trailer that can be used both for the purpose of transporting recreational vehicles—such as motorcycles and ATVS—as well as other goods, while also providing a sleeping space like a traditional recreational vehicle or fifth-wheel trailer, where the sleeping space does not significantly diminish the cargo storage capacity of the trailer. Such a trailer would ideally be light enough to be easily and safely pulled by most cars and traditional light trucks, thereby eliminating the need for the purchaser to also purchase an expensive, specialized tow vehicle. The limitations of the prior art are overcome by the present invention as described below.

References mentioned in this background section are not admitted to be prior art with respect to the present invention.

BRIEF SUMMARY OF THE INVENTION

The present invention is directed to an inexpensive, lightweight trailer that is useful both for carrying cargo, such as motorcycles, ATVs, and other recreational vehicles, as well as for camping. It utilizes a unique frame design in conjunction with one or more self-supporting, fold-out bunk doors to provide sleeping space for one or more campers, without using up valuable floor space that may be otherwise utilized for the storage of cargo. These bunks fold up against the trailer wall when in transit, but fold out from the wall of the trailer into the exterior space surrounding the trailer when the trailer is stationary. They are suspended by a relatively simple, inexpensive, lightweight system that is nevertheless capable of supporting the weight necessary to make the bunks safe and reliable. While the traditional frame designs used in cargo trailers would not support the weight of such bunks, the present invention is directed in certain embodiments to a redesigned trailer and frame to support the weight of such a bank. In various embodiments, a full-length hinge system may be used to connect the bunk to the frame, in combination with a cable system. The present invention is presented herein for illustration purposes in two particular embodiments, one utilized for steel-frame, plywood-wall trailers, the other for all-aluminum trailers. While the all-aluminum construction may be desirable for durability and strength, the steel-frame construction may be desirable for its generally lower manufacturing cost. In each embodiment, it may be seen then that the invention combines the advantages of inexpensive cargo trailers with traditionally larger, more expensive camping trailers. It may also be seen that the invention allows for a sleeping space to be incorporated with a cargo trailer without requiring the loss of any storage space within the cargo trailer.

In on aspect, the invention comprises a trailer comprising a trailer frame formed of a plurality of beams and comprising at least one bunk side and a top, wherein the bunk side comprises a header member extending the full length of the bunk side at the top, a trailer side wall attached to the trailer frame, wherein the trailer side wall defines a bunk opening, and a fold-out bunk pivotable between a first raised position and a second lowered position, wherein the bunk is hingedly connected to the trailer side wall at the bunk opening and configurable to close the bunk opening when the bunk is in the first raised position and to lie horizontally with respect to the trailer frame when the bunk is in the second lowered position.

In another aspect, the invention comprises a combination cargo and camping trailer, comprising a plurality of trailer walls defining a trailer interior configured to receive cargo, a trailer frame supporting the trailer walls, wherein the trailer frame comprises a side wall frame supporting a trailer side wall, and a bunk pivotally connected to the side wall frame, wherein the bunk is pivotable from a first raised vertical position to a second lowered horizontal position, and wherein the trailer frame is sufficiently rigid for the side wall to remain unbowed when the bunk is pivoted from the first raised position to the second horizontal position and a load of 300 pounds is applied to the bunk.

In still another aspect, the invention comprises an expandable cargo and camping trailer, comprising a trailer frame comprising a side wall frame comprising a top, wherein the trailer side wall frame comprises a header member comprising at least two lengths of joined hollow tubing extending along the top of the side wall frame, a sill member comprising at least two lengths of joined hollow tubing extending below and parallel to the header member, and a pair of side members each comprising at least two lengths of joined hollow tubing extending perpendicularly to the header member and the sill member and joined with the header member and the sill member, wherein the header member, sill member, and side members define a bunk opening, a hinge attached at the sill member, and a self-supporting bunk attached to the trailer frame by the hinge, wherein the bunk is sized to fit in the bunk opening when the bunk is in a raised position.

The features, objects and advantages of the present invention will become better understood from a consideration of the following detailed description of the preferred embodiments and appended claims in conjunction with the drawings as described following:

DETAILED DESCRIPTION OF THE PREFERRED EMBODIMENTS

Figure 4:
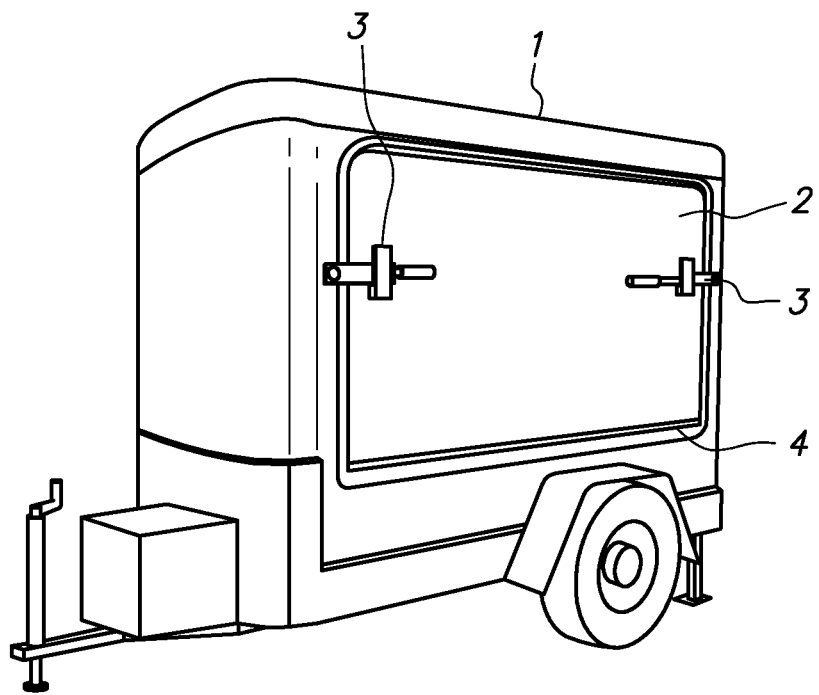
FIG. 4 is a perspective view of a preferred embodiment of the present invention with a single folding bunk in the raised position.
Figure 5:
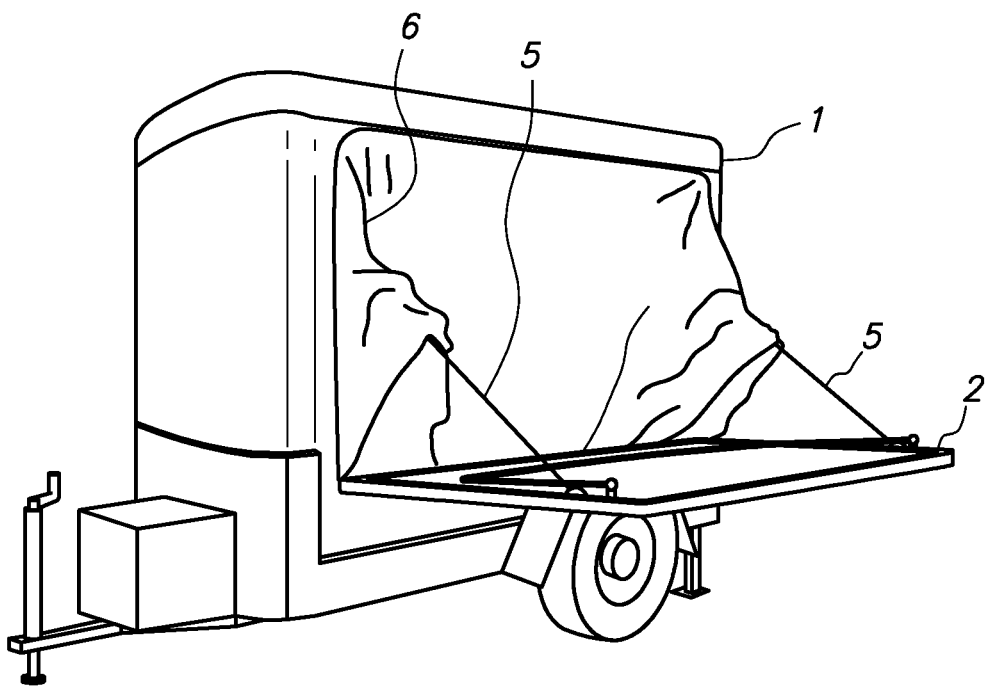
FIG. 5 is a perspective view of a preferred embodiment of the present invention with a single folding bunk in the lowered position.

FIGS. 4 and 5 illustrate a preferred embodiment of the present invention in overview. Expandable camping and cargo trailer 1 includes a bunk 2 that may be raised into a vertical position for travel, as shown in FIG. 4, then lowered to a horizontal position for camping, as shown in FIG. 5. Although one bunk is illustrated, more than one bunk may be employed in alternative embodiments, such as an embodiment in which a single bunk is positioned on either side of trailer 1. The side wall of trailer 1 comprises an opening sized to receive bunk 2 when bunk 2 is in the raised position, as shown in FIG. 5. Latches 3 serve to secure bunk 2 in the raised position during transit of trailer 1. Hinge 4 provides a pivoting connection point between the body of trailer 1 and bunk 2. In the preferred embodiment, hinge 4 is a full-length hinge that extends along the entire lower edge of bunk 2. The full-length hinge 4 is used to provide additional strength at this connection point. Cables 5, shown in FIG. 5, hold bunk 2 in a horizontal position when bunk 2 is lowered, and provide support for the weight of bunk 2 and the bunk occupant. Canopy 6, shown prior to deployment in FIG. 5, may be used to provide shelter over bunk 2 after it is lowered into the horizontal position. A mattress or other sleeping surface (not shown) may be placed on bunk 2 for the occupant after bunk 2 is lowered. Bunks of the type illustrated in the preferred embodiment of FIGS. 4 and 5 are known in the art, such as have been manufactured by Nappanee Window of Nappanee, Ill.

Figure 1:
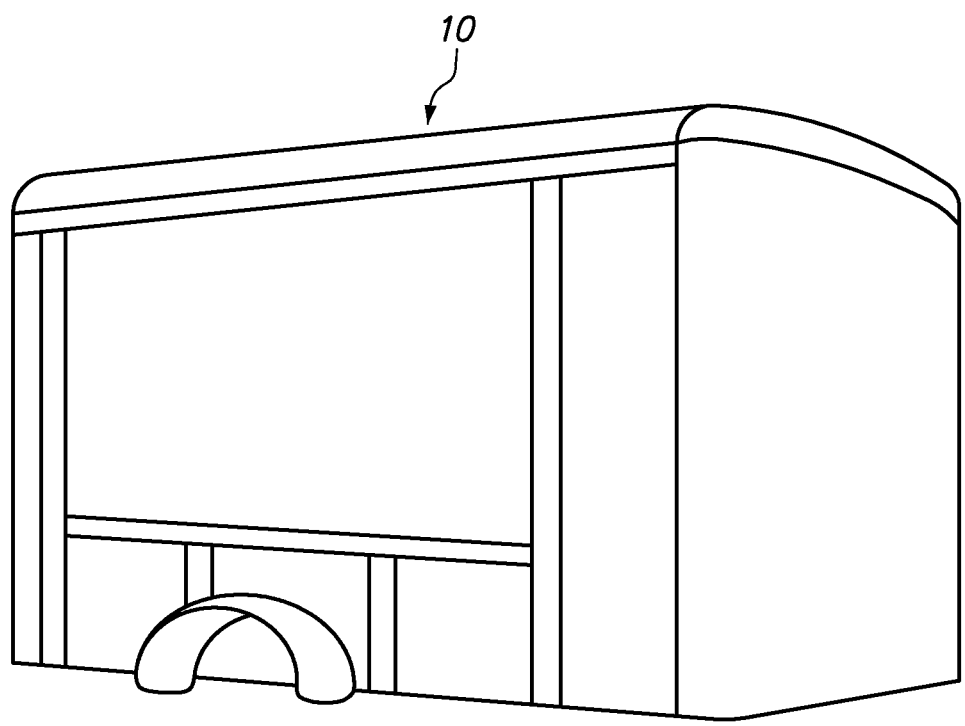
FIG. 1 is a perspective view of a prior art steel-frame cargo trailer design.
Figure 2:
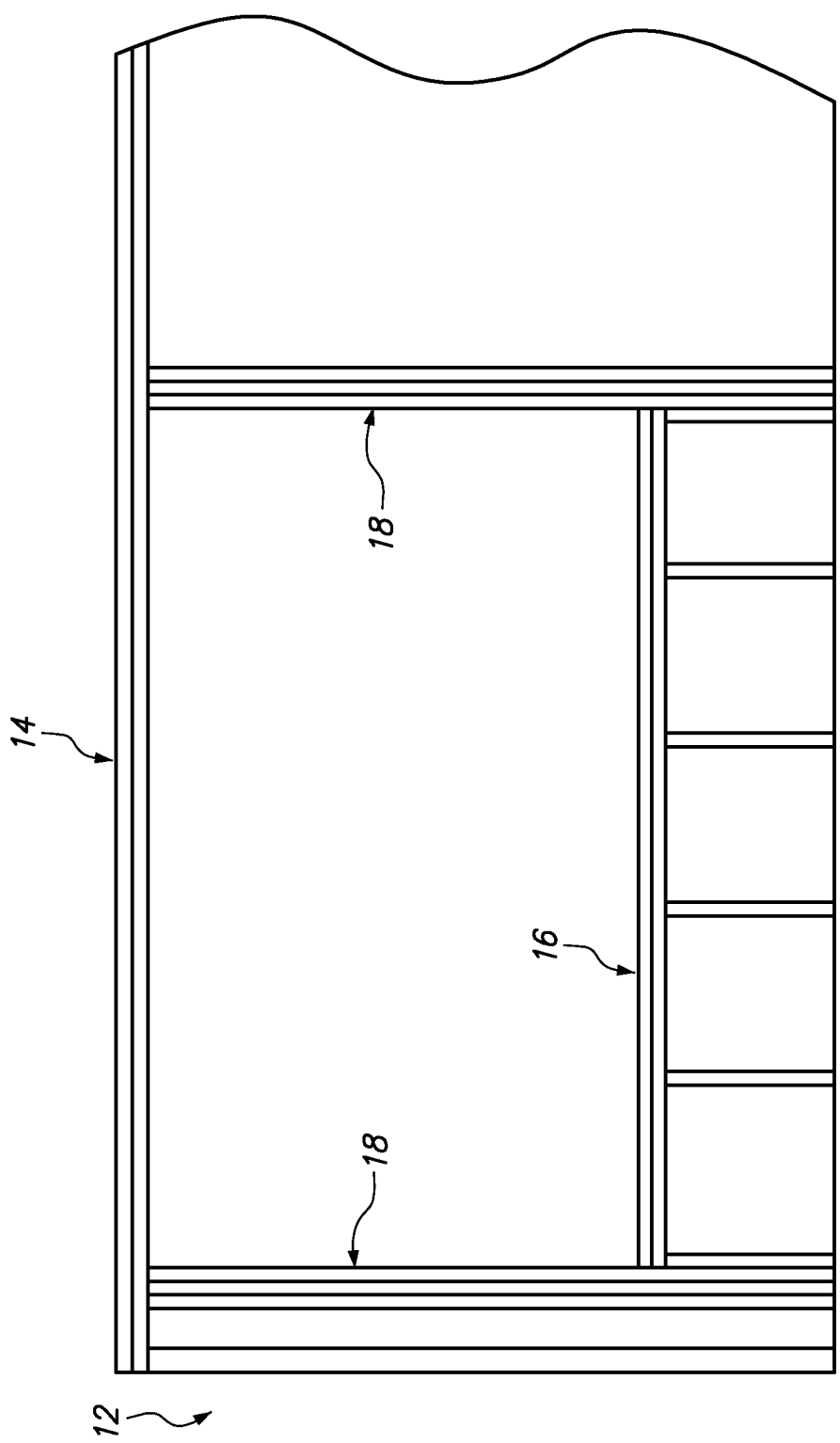
FIG. 2 is a side elevational view of a side wall for a preferred embodiment of the present invention utilizing a steel frame construction.
Figure 3:
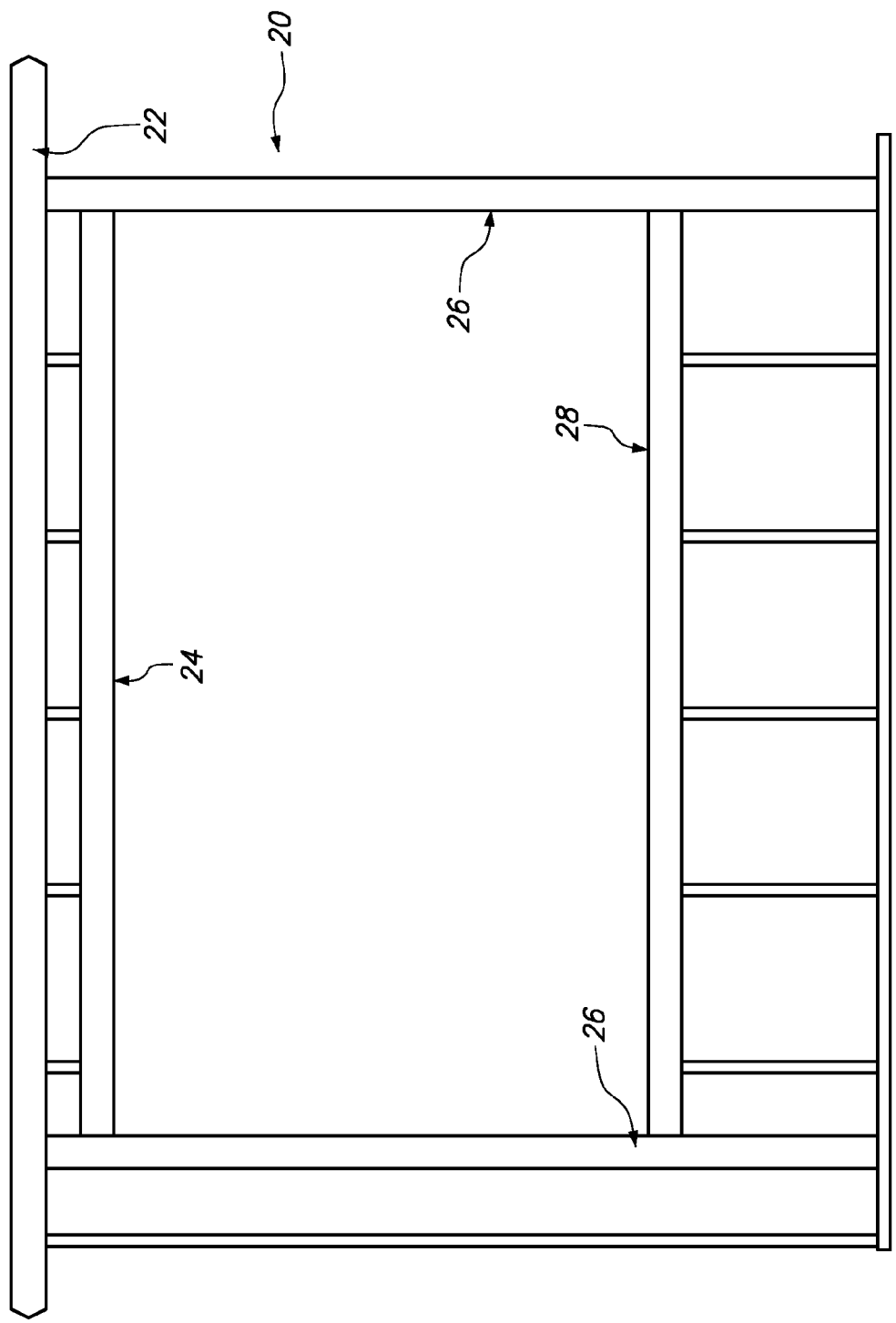
FIG. 3 is a side elevational view of a side wall for a preferred embodiment of the present invention utilizing an aluminum frame construction.

Turning to FIGS. 2 and 3, the construction of the frame for trailer 1 in order to provide the necessary support for bunk 2 according to the preferred embodiments of the present invention may now be described. For purposes of comparison, FIG. 1 illustrates a traditional (prior art) frame construction for a steel-frame, plywood-wall cargo trailer 10. It may be seen that the frame of trailer 10 is constructed of single lengths of hollow, steel box-frame supports. While this sort of frame is sufficient for the purpose of simply supporting the walls of a standard cargo trailer, the inventor has found that this frame design does not provide sufficient strength and support for a self-supporting bunk door added to the side wall of a small, lightweight trailer. In particular, the preferred embodiment of the present invention allows for a weight of at least 300 pounds to be applied to the bunk without deformation of the trailer wall when the bunk is in the lowered position. FIG. 2 illustrates a modified steel frame 12 for a steel-frame cargo trailer according to a preferred embodiment of the present invention to achieve these goals. In this preferred embodiment, steel header member 14 of trailer 12 is formed of a pair of joined 1¼" tubular box steel frame lengths that extend the entire length of the frame of trailer 12 along its roof. The tubular box steel is preferably spot-welded together every 8", with welds having a length of 1½" to 2". A similar double-type steel frame length forms window steel lower sill member 16. Steel side wall members 18 are preferably formed of three lengths of joined 1¼" tubular box steel frame welded together in a similar manner. By doubling and tripling the frame members in this manner, the strength of the opening formed by the frame members is greatly strengthened.

It should be noted that in the preferred embodiment of FIG. 2, steel header member 14 runs the entire length of steel trailer frame 12. This construction has been found to control bowing of the wall of steel trailer frame 12 that might otherwise result without the added strength of this design according to a preferred embodiment. Alternatively, larger steel frame tubing, such as 2"×3" steel frame, could be used in place of the multiple smaller tubes as described in the preferred embodiment in order to provide the required strength. In another alternative embodiment, an upper sill member (not shown) could be fitted below steel header member 14 and between steel side members 18 if the opening for bunk 2 is not intended to reach at or near the roof of trailer 1.

Referring now to FIG. 3, a modified frame for an aluminum-frame cargo trailer according to a second preferred embodiment of the present invention may be described. Aluminum frame 20 is generally formed of hollow aluminum tubing, such tubing being known in the art. Conventional aluminum-frame cargo trailers typically use 1" square aluminum tubing in the walls, which is sufficient to support the aluminum outer walls of a standard cargo trailer. This structure would not, however, support a fold-out bunk added to such a trailer. In the preferred embodiment of the present invention, aluminum header member 22 is formed of 1½"×3" rectangular aluminum tubing. This same material is used to form aluminum upper sill member 24, aluminum side members 26, and aluminum lower sill member 28. Similarly to the steel-frame preferred embodiment of the present invention described above, aluminum header member 22 preferably runs the entire length of aluminum trailer frame 20. This construction has been found to control bowing of the wall of aluminum trailer frame 20 that might otherwise result without the added strength of this design according to a preferred embodiment. In an alternative embodiment where bunk 2 is intended to reach at or near the roof of trailer 1, aluminum upper sill member 24 may be omitted, such that aluminum header member 22 serves as the upper sill for the opening sized to receive bunk 2.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

What is claimed is:

1. A trailer, comprising:
   (a) a trailer frame formed of a plurality of beams and comprising at least one bunk side and a top, wherein said at least one bunk side comprises a plurality of vertical beams welded perpendicularly to a horizontal header beam member extending along said at least one bunk side at said top and wherein said header beam member is of an equal length as said top;
   (b) a trailer side wall attached to said trailer frame, wherein said trailer side wall defines a bunk opening; and
   (c) a fold-out bunk pivotable between a first raised position and a second lowered position, wherein said bunk is hingedly connected to said trailer frame at said bunk opening and configurable to close said bunk opening when said bunk is in said first raised position and to lie horizontally with respect to said trailer frame when said bunk is in said second lowered position.

2. The trailer of claim 1, wherein said trailer frame comprises at least one beam formed by integrally joining a plurality of single beams along the length of the plurality of single beams, wherein said trailer frame comprises a lower sill member formed by integrally joining two single beams.

3. The trailer of claim 2, wherein said trailer frame comprises a plurality of side wall members formed by integrally joining two single beams.

4. The trailer of claim 3, wherein said trailer frame comprises a header member formed by integrally joining two single beams.

5. The trailer of claim 3, wherein said side wall members are formed by integrally joining three single beams.

6. The trailer of claim 2, wherein said joined single beams are joined by welding.

7. The trailer of claim 6, wherein said joined single beams are joined by spot welding.

8. A combination cargo and camping trailer, comprising:
(a) a plurality of trailer walls defining a trailer interior configured to receive cargo;
(b) a trailer frame supporting said trailer walls, wherein said trailer frame comprises a side wall frame comprising a plurality of vertical beams welded perpendicularly to a top horizontal header member, wherein the side wall frame is supporting a trailer side wall; and
(c) a bunk pivotally connected to said side wall frame, wherein said bunk is pivotable from a first raised vertical position to a second lowered horizontal position, and wherein said trailer frame is sufficiently rigid for said side wall to remain unbowed when said bunk is pivoted from said first raised position to said second horizontal position and a load of 300 pounds is applied to said bunk.

9. The combination cargo and camping trailer of claim 8, wherein said header member comprises at least one single, integrated frame member extending the entire length of said trailer side frame.

10. The combination cargo and camping trailer of claim 9, wherein said trailer side frame comprises at least one beam that comprises a plurality of integrally joined single beams that are integrally joined along the length of the single beams, and wherein said trailer frame comprises a lower sill member comprising two integrally joined single beams.

11. The combination cargo and camping trailer of claim 10, wherein said trailer side frame comprises a plurality of side wall members comprising two integrally joined single beams.

12. The combination cargo and camping trailer of claim 11, wherein said header member comprises two integrally joined single beams.

13. The combination cargo and camping trailer of claim 11, wherein said side wall members comprise three integrally joined single beams.

14. The combination cargo and camping trailer of claim 10, wherein said joined single beams are welded together.

15. The combination cargo and camping trailer of claim 14, wherein said joined single beams are spot welded together.

16. An expandable cargo and camping trailer, comprising:
(a) a trailer frame comprising a side wall frame comprising a top, wherein said trailer side wall frame comprises:
(i) a header member comprising at least two lengths of joined hollow tubing extending along said top of said side wall frame;
(ii) a sill member comprising two lengths of joined hollow tubing extending below and parallel to said header member wherein the two lengths of joined hollow tubing are joined together along the length of the joined lengths of joined hollow tubing; and
(iii) a pair of side members each comprising two lengths of joined hollow tubing extending perpendicularly to said header member and said sill member and welded to said header member and said sill member,
wherein said header member, sill member, and side members define a bunk opening;
(b) a hinge attached at said sill member; and
(c) a self-supporting bunk attached to said trailer frame by said hinge, wherein said bunk is sized to fit in said bunk opening when said bunk is in a raised position.

17. The expandable cargo and camping trailer of claim 16, wherein said header member extends along said top of said side wall frame and wherein said header member is of an equal length as said top of said side wall frame.

18. The trailer of claim 1, further comprising an open trailer rearward end, and at least one door hingedly attached at said open trailer rearward end.

19. The combination cargo and camping trailer of claim 8, further comprising an open trailer rearward end, and at least one cargo door hinged at said open trailer rearward end and configured to close the combination cargo and camping trailer when said cargo door is swung closed.

20. The expandable cargo and camping trailer of claim 16, further comprising an open trailer end, and a pair of cargo doors each hinged at one of said side members and positioned to close the expandable cargo and camping trailer open trailer end when said cargo doors are swung closed.

\* \* \* \* \*